United States Patent
Nguyen et al.

(10) Patent No.: US 9,722,955 B2
(45) Date of Patent: Aug. 1, 2017

(54) BUFFERED SESSION FILTERING FOR INLINE BYPASS APPLICATION

(71) Applicant: Gigamon Inc., Santa Clara, CA (US)

(72) Inventors: Hung Nguyen, San Jose, CA (US); Murali Bommana, Fremont, CA (US)

(73) Assignee: Gigamon Inc., Santa Clara, CA (US)

( * ) Notice: Subject to any disclaimer, the term of this patent is extended or adjusted under 35 U.S.C. 154(b) by 220 days.

(21) Appl. No.: 14/810,245

(22) Filed: Jul. 27, 2015

(65) Prior Publication Data
US 2017/0034078 A1  Feb. 2, 2017

(51) Int. Cl.
*H04L 12/701* (2013.01)
*H04L 12/64* (2006.01)
*H04L 12/861* (2013.01)
*H04L 12/947* (2013.01)
*H04L 12/26* (2006.01)
*H04L 29/06* (2006.01)

(52) U.S. Cl.
CPC .............. *H04L 49/25* (2013.01); *H04L 43/08* (2013.01); *H04L 63/1408* (2013.01); *H04L 69/22* (2013.01); *H04L 49/90* (2013.01)

(58) Field of Classification Search
CPC .. H04L 49/25; H04L 63/1408–63/1425; H04L 49/90; H04L 43/08
See application file for complete search history.

(56) References Cited

U.S. PATENT DOCUMENTS

| | | | |
|---|---|---|---|
| 2009/0092057 A1* | 4/2009 | Doctor | G06F 21/56 370/252 |
| 2011/0211473 A1* | 9/2011 | Matityahu | H04L 47/10 370/252 |
| 2014/0098816 A1* | 4/2014 | Matthews | H04L 49/201 370/390 |
| 2014/0201838 A1* | 7/2014 | Varsanyi | H04L 63/1425 726/23 |

* cited by examiner

*Primary Examiner* — Hoon J Chung
(74) *Attorney, Agent, or Firm* — Perkins Coie LLP (57) ABSTRACT

A switch appliance includes a first network port for communication with a first node, where the first network port is configured to receive a packet, and a second network port for communication with a second node. The switch appliance further includes a first instrument port for communication with a first inline tool, a buffer, and a processing unit coupled to the first network port, the second network port, the first instrument port and the buffer. The processing unit is configured to determine whether a packet processing state has been set as an inline-tool processing state or a bypass state, and is configured to pass the packet to the second network port for transmission to the second node, and to store a copy of the packet in the buffer, if the packet processing state has not been set as the inline-tool processing state nor the bypass state.

30 Claims, 6 Drawing Sheets

BUFFERED SESSION FILTERING FOR INLINE BYPASS APPLICATION

FIELD

This application relates generally to network devices, and more specifically, to inline-bypass switch appliances.

BACKGROUND

A switch appliance connected between two communicating network nodes may include a switch for forwarding packets to a tool. In some cases, the switch appliance may be an in-band device that participates in the network traffic production. In such cases, the switch appliance is a part of the network that communicates packets between the two nodes. Also, the tool may be an inline tool that is configured to monitor network traffic.

A new technique of processing packets using the switch appliance that is in communication with one or more inline tools is described herein.

SUMMARY

A switch appliance includes: a first network port for communication with a first node, the first network port configured to receive a packet; a second network port for communication with a second node; a first instrument port for communication with a first inline tool; a buffer; and a processing unit coupled to the first network port, the second network port, the first instrument port, and the buffer; wherein the processing unit is configured to determine whether a packet processing state has been set as an inline-tool processing state or a bypass state; wherein the processing unit is configured to pass the packet to the second network port for transmission to the second node, and also to store a copy of the packet in the buffer, if the packet processing state has not been set as the inline-tool processing state nor the bypass state.

Optionally, the processing unit is configured to pass the packet to the first inline tool if the packet processing state has been set as the an inline-tool processing state.

Optionally, the processing unit is configured to bypass the first inline tool by passing the packet to the second network port without sending the packet to the first instrument port, if the packet processing state has been set as the bypass state.

Optionally, the processing unit is configured to pass additional packets received at the first network port for transmission to the second node, and also to store copies of the additional packets in the buffer, until the processing unit has sufficient information to determine whether to set the packet processing state as the inline-tool processing state or the bypass state.

Optionally, the processing unit is configured to set the packet processing state as the inline-tool processing state based on the information.

Optionally, the processing state is for a session, and wherein when the packet processing state for the session is set as the inline-tool processing state, the processing unit is configured to operate the buffer to pass packets in the buffer belonging to the session to the first instrument port.

Optionally, the processing unit is configured to set the packet processing state as the bypass state based on the information.

Optionally, the processing state is for a session, and wherein when the packet processing state for the session is set as the bypass state, the processing unit is configured to pass subsequent packets belonging to the session to the second instrument port without sending the subsequent packets to the first instrument port.

Optionally, the switch appliance further includes a second instrument port for communication with a second inline tool.

Optionally, the processing unit is also configured to determine if a session has already been created for the packet.

Optionally, the processing unit is configured to create a session for the packet if there has been no session created for the packet.

Optionally, the processing unit is also configured to determine if packets in the buffer exceed a limit.

Optionally, the processing unit is configured to pass the buffered packets to a collector if the buffered packets in the buffer exceed the limit.

Optionally, the processing unit includes a packet deduplication module or a filter for removing duplicate packets received from the first inline tool.

Optionally, the processing unit is configured to add information to, or to modify information in, the packet.

A method performed by a switch appliance having a first network port for communication with a first node, a second network port for communication with a second node, a first instrument port for communication with a first inline tool, a buffer, and a processing unit coupled to the first network port, the second network port, the first instrument port, and the buffer, the method includes: receiving a packet at the first network port; determining whether a packet processing state has been set as an inline-tool processing state or a bypass state, wherein the act of determining is performed by the processing unit of the switch appliance; and passing the packet to the second network port for transmission to the second node, and storing a copy of the packet in the buffer, if the packet processing state has not been set as the inline-tool processing state nor the bypass state.

Optionally, the method further includes passing the packet to the first inline tool if the packet processing state has been set as the an inline-tool processing state.

Optionally, the method further includes bypassing the first inline tool by passing the packet to the second network port without sending the packet to the first instrument port, if the packet processing state has been set as the bypass state.

Optionally, the method further includes passing additional packets received at the first network port for transmission to the second node, and storing copies of the additional packets in the buffer, until the processing unit has sufficient information to determine whether to set the packet processing state as the inline-tool processing state or the bypass state, if the packet processing state has not been set as the inline-tool processing state nor the bypass state.

Optionally, the method further includes setting the packet processing state as the inline-tool processing state based on the information.

Optionally, the processing state is for a session, and wherein the method comprises passing packets in the buffer belonging to the session to the first instrument port when the packet processing state for the session is set as the inline-tool processing state.

Optionally, the method further includes setting the packet processing state as the bypass state based on the information.

Optionally, the processing state is for a session, and wherein the method further comprises passing subsequent packets belonging to the session to the second instrument port without sending the subsequent packets to the first instrument port, when the packet processing state for the session is set as the bypass state.

Optionally, the switch appliance further comprises a second instrument port for communication with a second inline tool, and wherein the method further comprises passing one or more additional packets to the second instrument port.

Optionally, the method further includes determining if a session has already been created for the packet.

Optionally, the method further includes creating a session for the packet if there has been no session created for the packet.

Optionally, the method further includes determining if packets in the buffer exceed a limit.

Optionally, the method further includes removing duplicate packets received from the first inline tool using a packet deduplication module or a filter.

Optionally, the method further includes adding information to, or modifying information in, the packet.

Optionally, the method further includes passing the buffered packets to a collector if the buffered packets in the buffer exceed the limit.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

Figure 1:
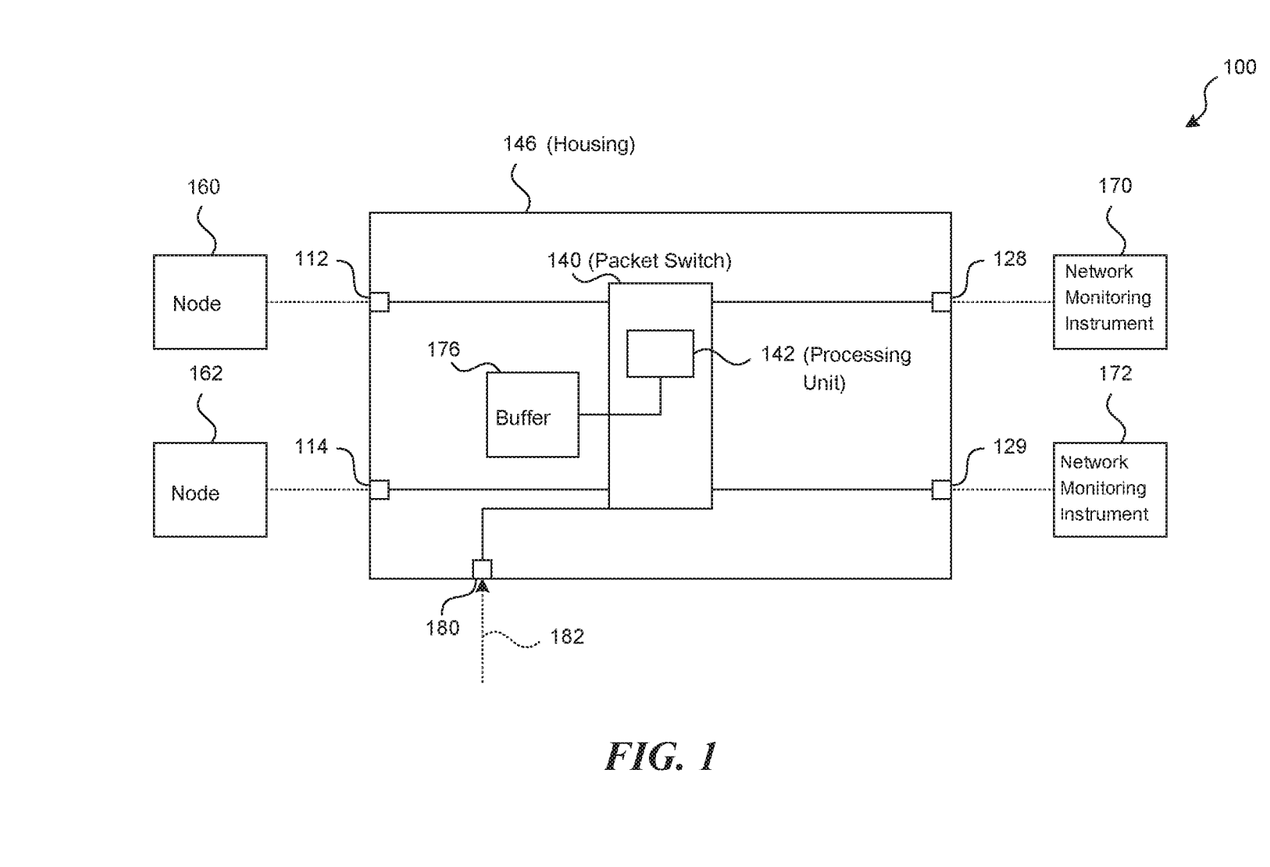
FIG. 1 illustrates a switch appliance/device.

FIG. 1 illustrates a network switch appliance/device 100 in accordance with some embodiments. The network switch device 100 includes a first network port 112, a second network port 114, a first instrument port 128, and a second instrument port 129. The switch device 100 also includes a packet switch (switch module) 140 with a processing unit 142, and a network switch housing 146 for containing the packet switch 140 and the processing unit 142. In the illustrated embodiments, the switch device 100 also includes other components, such as a Network PHY (not shown) coupled to each of the respective ports 112, 114, wherein the Network PHYs may be considered to be parts of the packet switch 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the switch device 100 may include an optical transceiver, or a SERDES, etc. The housing 146 allows the switch device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the switch device 100 may include more than two network ports. Also, although two instrument ports 128, 129 are shown, in other embodiments, the switch device 100 may include only one instrument port, or more than two instrument ports.

During use, the first network port 112 of the switch device 100 is communicatively coupled (e.g., via a network, such as the Internet) to a first node 160, and the second network port 114 is communicatively coupled (e.g., via a network, such as the Internet) to a second node 162. In some embodiments, the switch device 100 is configured to communicate packets between the first and second nodes 160, 162 via the network ports 112, 114. Also, during use, the instrument ports 128, 129 of the switch device 100 are communicatively coupled to respective instruments 170, 172. The instruments 170, 172 may be directly coupled to the switch device 100, or communicatively coupled to the switch device 100 through the network (e.g., Internet). In some cases, the switch device 100 is provided as a single unit that allows the switch device 100 to be deployed at a single point along a communication path. In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more instruments that are connected to respective instrument port(s) 128, 129. In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only non-virtualized packets. In further embodiments, one or more the network ports 112, 114 may be configured to receive only virtualized packets.

In one or more embodiments, the packet switch 140 may be any switch module that provides packet transmission in accordance with a pre-determined transmission scheme. In some embodiments, the packet switch 140 may be user-configurable such that packets may be transmitted in a one-to-one configuration (i.e., from one network port to an instrument port). In other embodiments, the packet switch 140 may be configured such that the packets may be transmitted in a one-to-many configuration (i.e., from one network port to multiple instrument ports). In other embodiments, the packet switch 140 may be configured such that the packets may be transmitted in a many-to-many configuration (i.e., from multiple network ports to multiple instrument ports). In further embodiments, the packet switch 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the switch device 100 so that the packets (or certain types of packets) are routed according to any one of these configurations. In some embodiments, the packet movement configuration is predetermined such that when the switch device 100 receives the packets, the switch device 100 will automatically forward the packets to the ports based on the predetermined packet movement configuration (e.g., one-to-one, one-to-many, many-to-many, and many-to-one).

As used in this specification, the term "instrument port" refers to any port that is configured to transmit packets to an instrument, such as a network monitoring instrument. In the illustrated embodiments, the network monitoring instrument 170/172 is a pass-through device or an inline tool (i.e., it can receive packets, and transmit the packets back to the switch device 100 after the packets have been processed), such as an intrusion prevention system. In other embodiments, the switch device 100 may also include one or more instrument ports communicating with network monitoring instrument(s) that may be a non-pass through devices (i.e., each of such devices can only receive packets intended to be communicated between two nodes, and cannot transmit such packets downstream), such as a sniffer, a network monitoring system, an application monitoring system, an intrusion detection system, a forensic storage system, an application security system, etc.

In accordance with some embodiments, the packet switch 140 may have the functionalities of a conventional packet switch except that it provides visibility into various parts of a network. Thus, embodiments of the packet switch 140 may operate like a conventional managed packet switch, but providing packet monitoring function. This is accomplished by configuring the packet switch 140 to operate as a circuit switch under certain circumstances. In some embodiments, the configuring of the managed packet switch may be performed by utilizing a CPU interface of the switch to modify appropriate registers in the switch to allow for the desired operation.

In the illustrated embodiments, the packet switch 140 is an "in-band" network switch, which is configured to obtain packets transmitted from one node and received at one network port, and to pass them to another network port for transmission to another node that is the intended receiving node. As used in this specification, the term "in-band" device/switch refers to a device that is involved in a transmission of a packet (that is transmitted from node 1 and intended for reception by node 2) to the intended receiving node 2. Also, the term "out-of-band" device/switch refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the network switch device 100 may be an in-band device if it receives a packet (intended for transmission from node 1 to node 2) from a network, and passes the packet back to the network (e.g., after the packet has been processed by a pass-through monitoring tool) for transmission downstream to the node 2. The same network switch device 100 may also be an out-of-band device if it receives another packet from the network, and does not pass the packet back to the network for transmission to the intended receiving node.

It should be noted that the packet switch 140 that may be used with the switch device 100 is not limited to the examples described above, and that other packet switches 140 with different configurations may be used as well. Also, in one or more embodiments described herein, the packet switch 140 may be implemented using an integrated circuit, such as a processor (e.g., a general purpose processor, a network processor, an ASIC processor, a FPGA processor, etc.). Thus, the term "packet switch" or "switch module" may refer to any circuit that is capable of performing the functions described herein, and should not be limited to a switch or a processor.

In other embodiments, the switch device 100 may optionally include an additional processing unit (e.g., a processor) communicatively coupled to the processing unit 142. The additional processing unit may be used to perform additional packet processing, such as packet de-duplication, header modification, tagging, header stripping, etc., in some embodiments. In some embodiments, the additional processing unit may be located outside the housing of the switch device 100. In other embodiments, the additional processing unit may be a part of the packet switch 140. For example, the additional processing unit may be considered to be a part of the processing unit 142. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 142 is illustrated as a component of the packet switch 140. In other embodiments, the processing unit 142 may be a separate component from the packet switch 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. The processing unit 142 may be implemented using one or more processors, wherein one or more of the processors may be considered to be a part of the switch device 100 or not. Also, in some embodiments, the packet switch 140 may include ternary content-addressable memory (TCAM). The packet switch 140 may be configured to perform various packet processing functions, included but not limited to packet filtering, packet routing, packet switching, packet mirroring, packet aggregation, etc.

As shown in the figure, the switch device 100 further includes a port 180 for receiving configuration information 182 to thereby configure the packet switch 140 (e.g., the processing unit 142 in the packet switch). In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the switch device 100 may include multiple ports 180 for receiving configuration information 182. In some cases, one or more of the ports 180 may be used to implement the network ports 112, 114, thereby allowing the same port(s) 180 for receiving the configuration information 182 to also receive network traffic.

In some embodiments, the switch device 100 may be used by multiple users. In some cases, there may be multiple users who are given access to configuration items for the switch device 100. For example, different users may be given permission to view different operating parameters (e.g., filtering rule(s), map(s), port assignment, etc.) for the switch device 100. As another example, different users may be given permission to different resources (e.g., software, devices, databases, software functions, device functions, database functions, etc.) for configuring the switch device 100. Thus, as used in this specification, the term "configuration item" may refer to any operating parameter(s) utilized by the switch device 100, any resource(s) that is involved in configuring the switch device 100, or combination of both. The configuration item may be stored or implemented in the switch device 100, or may be stored or implemented outside the switch device 100.

As shown in the figure, the switch device 100 also includes a buffer 176 (e.g., a queue) for temporarily storing packets. In some embodiments, the buffer 176 is configured to store packets for sufficient time until the processing unit 142 has enough information to determine whether the packets are to be passed to one or more instrument ports for transmission to one or more tools 170, 172, or not.

The processing unit 142 of the network switch device 100 may use various techniques to process packets received at the network port 112 and/or the network port 114, in order to determine whether to pass the packets to the instrument port 128 and/or the instrument port 129 for processing by one or more network monitoring instruments 170, 172 or not. For example, the processing unit 142 may analyze header information, content in the body of the packet, or both, in order to determine whether the packet in a session matches certain criteria. In some cases, the criteria may be user defined.

For example, in some cases, a user of the switch device 100 may want to bypass certain network traffic (e.g., certain network traffic from safe websites, certain types of traffic such as video, etc.), so that only certain desired network traffic will be received by the network monitoring instrument(s). This feature is advantageous because it saves bandwidth for the network monitoring instrument(s) 170/172. However, the matching criteria of the network traffic that is desired to be bypassed may not be known from the packet headers. Accordingly, if the packets of the network traffic are transmitted to the network monitoring instrument(s) 170/172 first without first identifying whether the network traffic is desired to be bypassed (i.e., not to be processed by any network monitoring instrument), then the network monitoring instrument(s) 170/172 will receive this network traffic undesirably.

One technique for attempting to address the above problem is to buffer packets at a buffer first, without passing them to the instrument port(s) 128/129 for transmission to the network monitoring instrument(s) 170/172. In such technique, the processing unit 142 may be configured to process the buffered packets to determine if the packets in certain session are desired to be bypassed (i.e., to be passed to a network port for transmission to the intended recipient without being processed by any network monitoring instrument). In particular, when the buffer 176 has stored enough packets (information) for allowing the processing unit 142 to make such determination, the processing unit 142 may then determine a course of action for the packets in that session. The processing unit 142 may determine that the packets belong to certain type of network traffic that is desired to be monitored by the network monitoring instrument(s), in which case, the processing unit 142 may then control the buffer 176 to release the buffered packets for transmission to one or more network monitoring instrument(s) 170/172 through the instrument port 128 and/or instrument port 129. Alternative, the processing unit 142 may determine that the packets belong to certain type of network traffic that is not to be processed by the network monitoring instrument(s). In such case, the buffered packets are not released for transmission to one or more network monitoring instrument(s) 170/172.

However, the above technique may not be desirable because if packets received from a node are buffered, the intended receiving node (e.g., node 162) of the packets will not receive such packets, and will not respond. This has the undesirable effect that the network communication between the two nodes may stop, and the switch device 100 may not receive a complete set of packets for processing. For example, the node 160 (e.g., a client) may send a TCP SYN packet to the node 162 (e.g., a video server) via the switch device 100. However, if the packet is buffered at the switch device 100, then the node 162 will never see the SYN REQ, and will not reply with a SYN ACK to complete the TCP connection.

In accordance with one or more embodiments, the processing unit 142 of the switch device 100 is configured to process packets using a special technique that addresses the above issues. In particular, the processing unit 142 of the switch device 100 is configured to pass a packet transmitted by the node 160 and received at a network port 112, to another network port 114 for transmission to the intended receiving node 162, while creating a copy of the packet for storage at the buffer 176. The buffer 176 is configured to buffer packets received at the network port 112 until the processing unit 142 has sufficient information to determine whether the packets (associated with certain session) in the buffer are to be passed downstream to one or more instrument ports 128, 129 for processing by one or more network monitoring instruments, or not. This way, packets are not held up at the buffer 176, and are instead transmitted between the nodes 160, 162 to keep the communication going. Also, because packets are stored at buffer 176 for allowing the processing unit 142 to determine whether to pass the packets to the network monitoring instrument(s) or not, packets are not undesirably transmitted to the network monitoring instrument(s).

In one implementation, the processing unit 142 is configured to set a processing state for packets belonging to certain session. The processing state may be an inline-tool processing state, or a bypass state. If the processing unit 142 sets the processing state to be the inline-tool processing state, the packets belonging to certain session are then passed to one or more instrument ports 128, 129 for transmission to one or more network monitoring instruments 170, 172. If the processing unit 142 sets the processing state to be the bypass state, the packets belonging to certain session are not passed to one or more network monitoring instruments 170, 172, and are instead transmitted to the intended receiving node without being processed by any network monitoring instrument (e.g., an inline tool).

Figure 2:
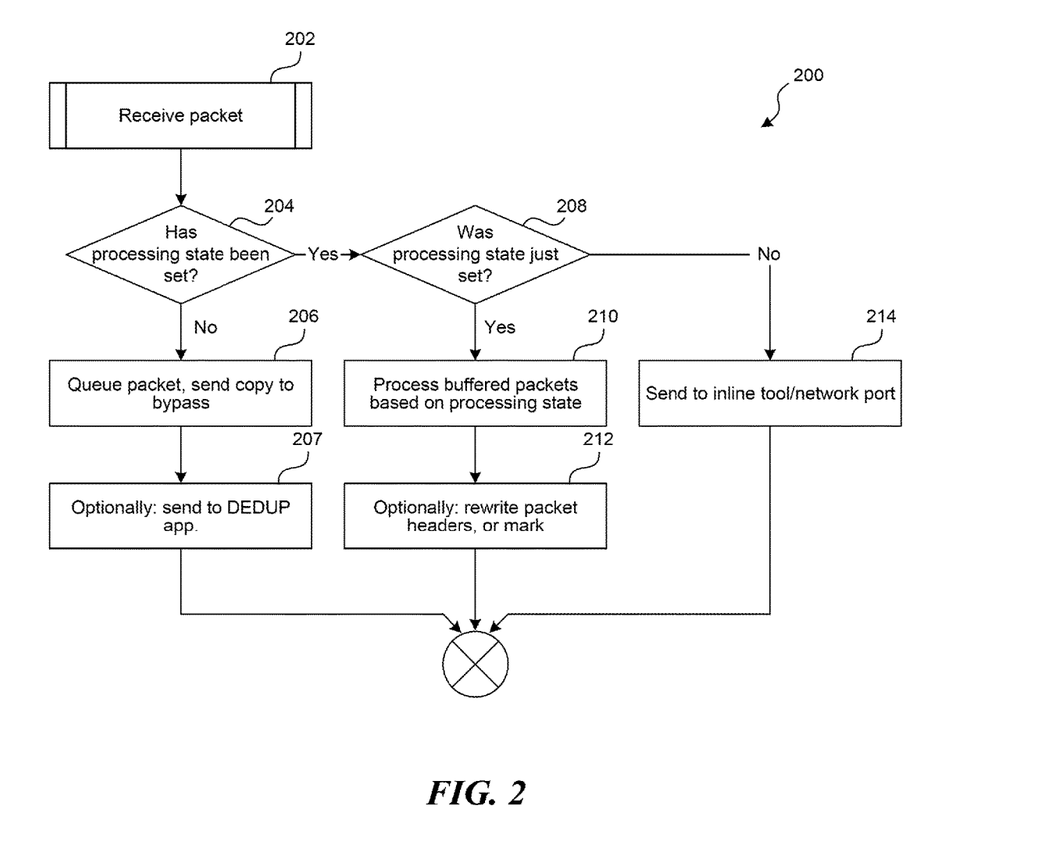
FIG. 2 illustrates a method for processing packets in accordance with some embodiments.

FIG. 2 illustrates a method 200 for processing packets in accordance with some embodiments. First, packet is received at a network port (e.g., network port 112) at the switch device (item 202). The processing unit 142 then determines whether a processing state has been set for the packet (item 204).

If the processing state has not been set for the packet, the packet is then passed downstream to another network port (e.g., network port 114) for reception by the intended receiving node, and a copy of the packet is stored in the buffer 176 (item 206). As used in this specification, the term "copy" refers to an identical version of another packet. Thus, a copy of a packet may be the original packet, or may be a subsequently created duplicate version of the original packet. Similarly, the term "packet" may refer to the original packet, or may be a subsequently created duplicate version of the original packet.

As shown in item 207, in some cases, the packet may optionally be sent to a packet deduplication module so that the packet deduplication module can identify duplicate packet. For example, the processing unit 142 may include a packet deduplication module 504 for identifying and/or removing duplicate packets. The packet deduplication module 504 keeps track of packets that have been passed to the intended receiving node (e.g., node 162), and/or packets that have been passed to one or more inline tools. For example, a packet may be passed to the node 162, while a copy of the packet is passed to an inline tool. After the inline tool processes the packet, it will return the packet to the switch device 100. In such case, the packet deduplication module 504 may detect that the returned packet is a duplicate of a packet that was already passed to the node 162. Accordingly, the packet deduplication module 504 may then drop the returned packet that was communicated from the inline tool. In some embodiments, the packet deduplication module 504 may use header information, packet body, information derived from header information, information derived from any portion(s) of the packet body, information added to or modified in the packet, or any combination of the foregoing, to identify duplicate packets. Also, in some embodiments, the processing unit 142 may add a tag (e.g., VLAN tag) to a packet header, and the packet deduplication module 504 may use the tag to identify duplicate packets. Furthermore, in some embodiments, the processing unit 142 may add tag or header, or modify packet header, e.g., VLAN tag, or SRC MAC address(es), etc., to the buffered packets before sending them to the inline tool(s). In such cases, the switch device 100 may include a filter (such as the filter 510 described below with reference to FIG. 5) to filter out packets returned from the inline tool(s) based on the added or modified information, and strip the added tag/header if applicable.

If the processing state has been set for the packet, the processing unit 142 then determines whether the processing state has just been set (item 208). For example, if the processing state is set based on the current packet being processed, then that means the processing state has just been set. On the other hand, if the processing state was already set previously based on a previous packet, then the processing unit 142 may determine that the processing state was already set previously (i.e., it is not just set based on the current packet).

If the processing unit 142 determines that the processing state has just been set based on the current packet in a particular session, then any packets buffered at the buffer 176 for the particular session will need to be processed (item 210), because the buffered packets have not been passed downstream. In particular, if the packet processing state has been set to be inline-tool processing state, the buffered packets for the session are then released and passed to one or more instrument ports for transmission to one or more inline tools. After the buffered packets for that session have been released, the buffer 176 does not contain any packets for that session. After the inline tool(s) processes the packets, the packets are transmitted back to the switch device 100. However, because copies of the packets were already previously passed downstream in item 206 to network port for reception by the intended receiving node (e.g., node 162), the packets transmitted from the inline tool(s) should be removed. In one implementation, a packet deduplication module may be used to process these packets and drop them.

Alternatively, in item 210, if the packet processing state has been set to be the bypass state, the buffered packets are then passed to a deduplication module to remove packets that have already been sent to the network port for reception by the intended receiving node. In particular, because copies of the buffered packets were already previously passed downstream in item 206 for transmission to the intended receiving node, the buffered packets are duplicates, and should be dropped. Accordingly, all packets belonging to the same session are cleared from the buffer 176.

As shown in item 212, in some cases, the packet may optionally be sent to a packet deduplication module so that the packet deduplication module can identify duplicate packet. For example, the processing unit 142 may include a packet deduplication module 504 for identifying and/or removing duplicate packets. The packet deduplication module 504 keeps track of packets that have been passed to the intended receiving node (e.g., node 162), and/or packets that have been passed to one or more inline tools. For example, a packet may be passed to the node 162, while a copy of the packet is passed to an inline tool. After the inline tool processes the packet, it will return the packet to the switch device 100. In such case, the packet deduplication module 504 may detect that the returned packet is a duplicate of a packet that was already passed to the node 162. Accordingly, the packet deduplication module 504 may then drop the returned packet that was communicated from the inline tool. In some embodiments, the packet deduplication module 504 may use header information, packet body, information derived from header information, information derived from any portion(s) of the packet body, information added to or modified in the packet, or any combination of the foregoing, to identify duplicate packets. Also, in some embodiments, the processing unit 142 may add a tag (e.g., VLAN tag) to a packet header, and the packet deduplication module 504 may use the tag to identify duplicate packets. Furthermore, in some embodiments, the processing unit 142 may add tag or header, or modify packet header, e.g., VLAN tag, or SRC MAC address(es), etc., to the buffered packets before sending them to the inline tool(s). In such cases, the switch device 100 may include a filter (such as the filter 510 described below with reference to FIG. 5) to filter out packets returned from the inline tool(s) based on the added or modified information, and strip the added tag/header if applicable.

Returning to item 208, if the processing unit 142 determines that the packet processing state was already set previously, e.g., based on previously received packet(s), that means that the buffered packets for the particular session were already cleared from the buffer. In such case, and if the packet processing state was previously set to be inline-tool processing state, the current packet being processed is then passed to one or more instrument ports for transmission to one or more inline tools (item 214). Alternatively, in item 214, if the packet processing state was previously set to be the bypass state, the current packet is then passed to a network port for reception by the intended receiving node. It should be noted that in either case, no packet deduplication is needed because the current packet being processed in item 214 was not previously passed downstream to a network port for transmission to the intended receiving node.

Figure 3:
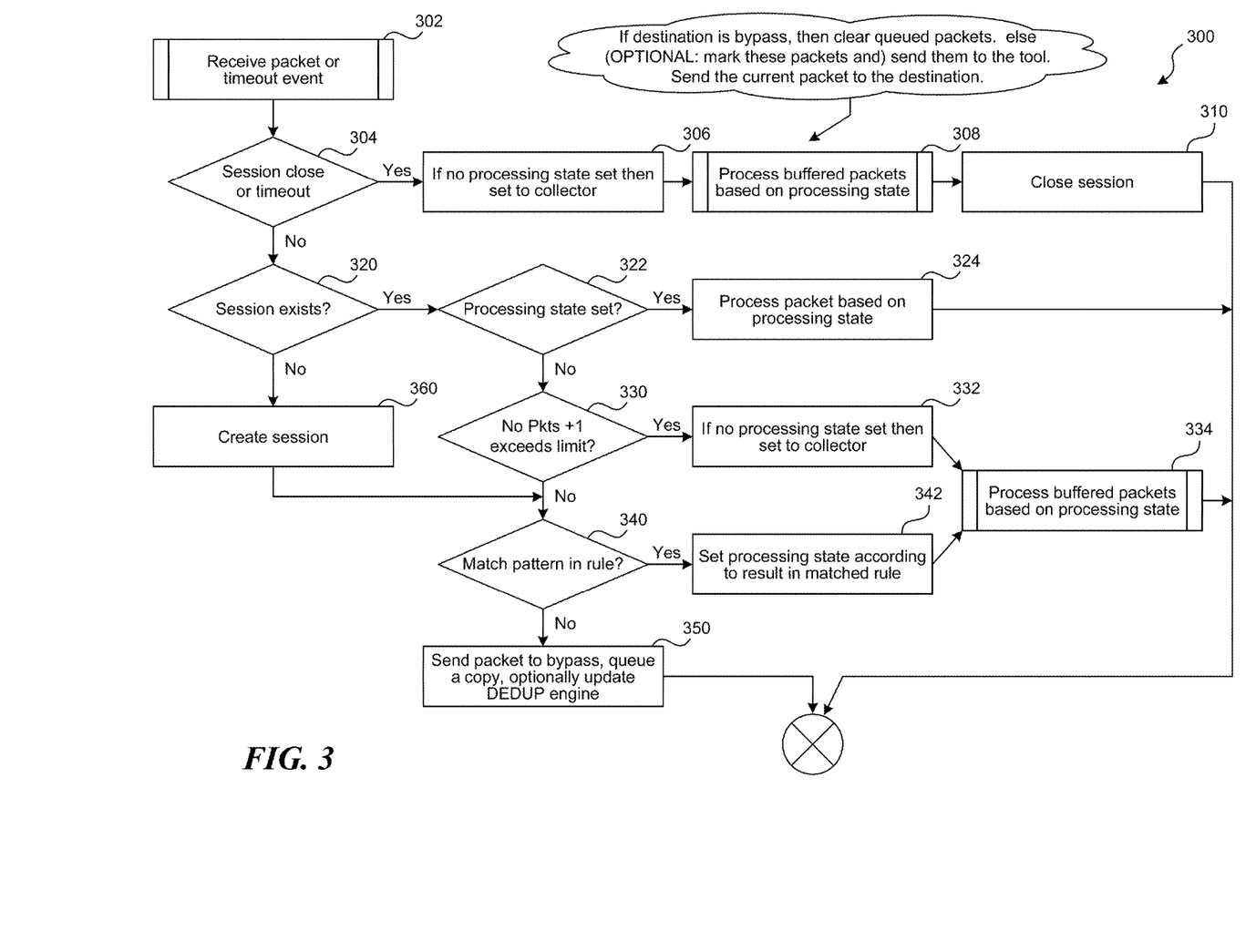
FIG. 3 illustrates another method for processing packets in accordance with some embodiments.

In some embodiments, the processing unit 142 may also be configured to determine if packets in the buffer exceed a limit. If packets in the buffer exceed a certain limit, the processing unit 142 may pass the buffered packets to a collector. FIG. 3 illustrates a method 300 for processing packets that includes buffer monitoring in accordance with some embodiments. First, packet is received at a network port (e.g., network port 112) at the switch device 100 (item 302). The processing unit 142 then determines whether it is desirable to close a session or whether a session is timed out (item 304). For example, in some cases, an error may occur while processing packets belonging in a certain session. In such cases, it may be desirable to close the session. Also, a session may be timed out due to an error. In some cases, if either of these conditions occur, the processing unit 142 may place the current packet in the buffer 176, and if no processing state has been set for the packet, the packet is then sent to a collector (item 306). Alternatively, if the packet processing state has been set to be the inline-tool processing state or the bypass state, then the current packet together with other packets belonging to the same session in the buffer 176 are processed based on the set state (item 308). The session for the packet is then closed (item 310).

Returning to item 304, if the processing unit 142 determines that there is no session closing or timeout, the method 300 then moves on to item 320 in which the processing unit 142 determines whether a session exists for the current packet. If a session does not exist, then the processing unit 142 creates a session for the packet (item 360). On the other hand, if a session already exists for the current packet, the processing unit 142 then determines if the processing state was already set previously (item 322). If the processing state was already set previously, the processing unit 142 then processes the packet in accordance with the set processing state (item 324). For example, if the processing state was already set to be the inline-tool processing state for the packet in a particular session, the processing unit 142 then passes the packet downstream to one or more instrument ports for processing by one or more inline tools. In the case in which an inline tool is an IPS system, if it detects potential intrusion, it may drop the packets and subsequent packets in the session, or it may send a TCP reset to the switch device 100 for transmission to the intended receiving node for TCP traffic. Alternatively, if the processing state was previously set to be the bypass state, the processing unit 142 then passes the packet to a network port for transmission downstream to the intended receiving node.

Returning to item 322, if the processing unit 142 determines that the processing state was not set, then a packet counter for the packets stored in the buffer 176 is updated (e.g., +1), and the processing unit 142 determines whether the packet counter exceeds a certain limit (item 330). If the packet counter for a certain session exceeds the limit, the packet is then stored temporarily at the buffer 176, and the packets in the buffer 176 belonging to the session is sent to a collector (item 332).

Returning to item 330, if the processing unit 142 determines that the packet counter for the session is not exceeded, the processing unit 142 then determines if the packet matches certain criteria for which it is desirable to be processed by inline tool(s) (item 340). Various techniques may be used to determine whether there is a match. In some cases, the header information of the packet may be analyzed to see if the field value or a combination of the values in the header fields matches certain criteria. Also, the body of the packet may be searched for key word(s). For example, a user may want to identify certain communication session in which the content includes "bomb" and "white house". In such cases, the packets belonging to certain session may be analyzed to search for these key terms. It is possible that one packet in a session may not contain any of such key terms, but then one or more subsequent packets in the same session may include both of these key terms.

If a match has been found, the packet is then stored at the buffer 176, and the packet processing state (for the session to which the matched packet belongs) is set to be the inline-tool processing state (item 342). The processing unit 142 then processes the packets in the buffer based on the set processing state (item 334). In particular, because the processing state has been set to be the inline-tool processing state, all packets in the buffer 176 belonging to the session for which a match has been found are passed to one or more instrument ports for transmission to one or more inline tools. In the case in which an inline tool is an IPS system, if it detects potential intrusion, it may drop the packets and subsequent packets in the session, or it may send a TCP reset to the switch device 100 for transmission to the intended receiving node for TCP traffic.

Returning to item 340, if a match has not been found, the packet is then passed downstream to a network port for transmission to the intended receiving node (e.g., the node 162), and a copy of the packet is stored in the buffer 176 (item 350).

In some cases, at item 350 and item 342, the packet may optionally be sent to a packet deduplication module so that the packet deduplication module can identify duplicate packet. For example, the processing unit 142 may include a packet deduplication module 504 for identifying and/or removing duplicate packets. The packet deduplication module 504 keeps track of packets that have been passed to the intended receiving node (e.g., node 162), and/or packets that have been passed to one or more inline tools. For example, a packet may be passed to the node 162, while a copy of the packet is passed to an inline tool. After the inline tool processes the packet, it will return the packet to the switch device 100. In such case, the packet deduplication module 504 may detect that the returned packet is a duplicate of a packet that was already passed to the node 162. Accordingly, the packet deduplication module 504 may then drop the returned packet that was communicated from the inline tool. In some embodiments, the packet deduplication module 504 may use header information, packet body, information derived from header information, information derived from any portion(s) of the packet body, information added to or modified in the packet, or any combination of the foregoing, to identify duplicate packets. Also, in some embodiments, the processing unit 142 may add a tag (e.g., VLAN tag) to a packet header, and the packet deduplication module 504 may use the tag to identify duplicate packets. Furthermore, in some embodiments, the processing unit 142 may add tag or header, or modify packet header, e.g., VLAN tag, or SRC MAC address(es), etc., to the buffered packets before sending them to the inline tool(s). In such cases, the switch device 100 may include a filter (such as the filter 510 described below with reference to FIG. 5) to filter out packets returned from the inline tool(s) based on the added or modified information, and strip the added tag/header if applicable.

Figure 4:
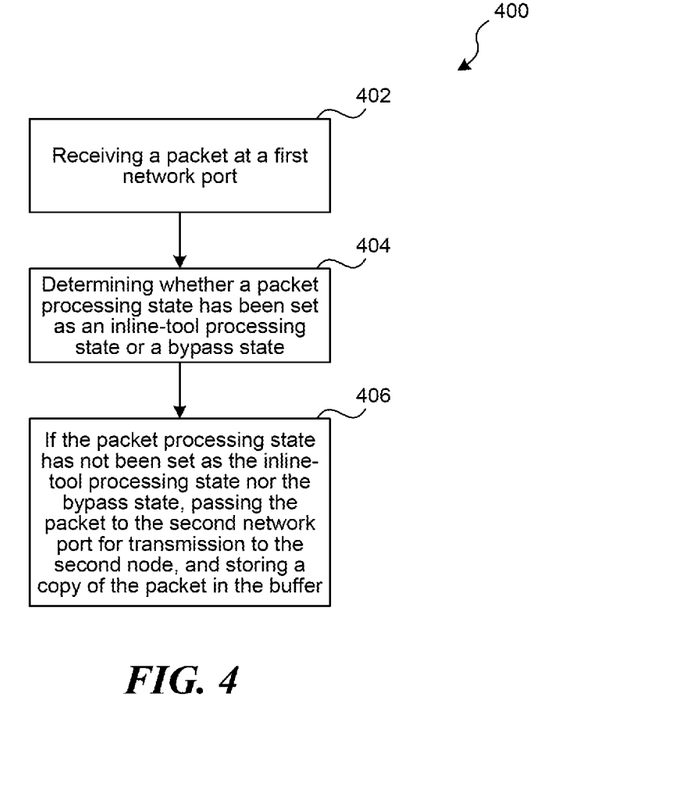
FIG. 4 illustrates a method in accordance with some embodiments.

FIG. 4 illustrates a method 400 in accordance with one or more embodiments described herein. The method 400 is performed by a switch appliance having a first network port for communication with a first node, a second network port for communication with a second node, a first instrument port for communication with a first inline tool, a buffer, and a processing unit coupled to the first network port, the second network port, the first instrument port, and the buffer. In one implementation, the switch appliance performing the method 400 may be the switch device 100 of FIG. 1. The method 400 includes: receiving a packet at the first network port (item 402). In some cases, the act of receiving the packet may be performed by the network port (e.g., the network port 112/114) of the switch device. In other cases, the act of receiving may be considered as being performed by the processing unit 142 after the packet is passed from the network port to the processing unit 142. Next, the processing unit 142 determines whether a packet processing state has been set as an inline-tool processing state or a bypass state (item 404). If the packet processing state has not been set as the inline-tool processing state nor the bypass state, the processing unit 142 then passes the packet to the second network port for transmission to the second node, and stores a copy of the packet in the buffer (item 406).

The method 400 may further include passing the packet to the first inline tool if the packet processing state has been set as the an inline-tool processing state. In some embodiments, the act of passing the packet may be performed by the processing unit 142, which generates a control signal to cause the packet to be passed to the instrument port communicating with the first inline tool.

The method 400 may further include bypassing the first inline tool by passing the packet to the second network port without sending the packet to the first instrument port, if the packet processing state has been set as the bypass state. In some embodiments, the act of bypassing the first inline tool may be performed by the processing unit 142, which generates a control signal to cause the packet to be passed to the second network port without sending the packet to any instrument port.

The method 400 may further include passing additional packets received at the first network port for transmission to the second node, and storing copies of the additional packets in the buffer, until the processing unit has sufficient information to determine whether to set the packet processing state as the inline-tool processing state or the bypass state, if the packet processing state has not been set as the inline-tool processing state nor the bypass state.

The method 400 may further include setting the packet processing state as the inline-tool processing state based on the information. The act of setting the packet processing state as the inline-tool processing state may be performed by the processing unit 142. In one implementation, the processing unit 142 may include a state setting module for setting the packet processing state. In some cases, the processing state is for a session, and the method 400 further includes passing packets in the buffer belonging to the session to the first instrument port when the packet processing state for the session is set as the inline-tool processing state. The act of passing the packets in the buffer may be performed by the processing unit 142, which generates a control signal to cause the buffered packets to be passed. In other cases, the act of passing the packets may be considered as being performed by the buffer (e.g., the buffer 176 in the switch device 100).

The method 400 may further include setting the packet processing state as the bypass state based on the information. The act of setting the packet processing state as the bypass state may be performed by the processing unit 142. In one implementation, the processing unit 142 may include a state setting module for setting the packet processing state. In some cases, the processing state is for a session, and the method 400 may further include passing subsequent packets belonging to the session to the second instrument port without sending the subsequent packets to the first instrument port, when the packet processing state for the session is set as the bypass state. The act of passing the subsequent packets may be performed by the processing unit 142, which generates a control signal to cause subsequent packets to be passed.

In some embodiments, the method 400 further includes determining if a session has already been created for the packet. In one implementation, the processing unit 142 may include a session management module that manages sessions for the different packets received at the switch device 100. The session management module may create a session for the packet if there has been no session created for the packet. Also, if a session has been created, the session management module keeps track of the packets that have been received by the switch device 100, to ensure that the packets belonging to the same session are stored in association with each other for that session.

In some cases, the method 400 may further include determining if packets in the buffer 176 exceed a limit. For example, the processing unit 142 may include a buffer monitoring module that keeps track of the number of packets stored in the buffer 176. The processing unit 142 may generate a control signal to cause the buffered packets to be passed a collector if the buffered packets in the buffer exceed the limit.

Figure 5:
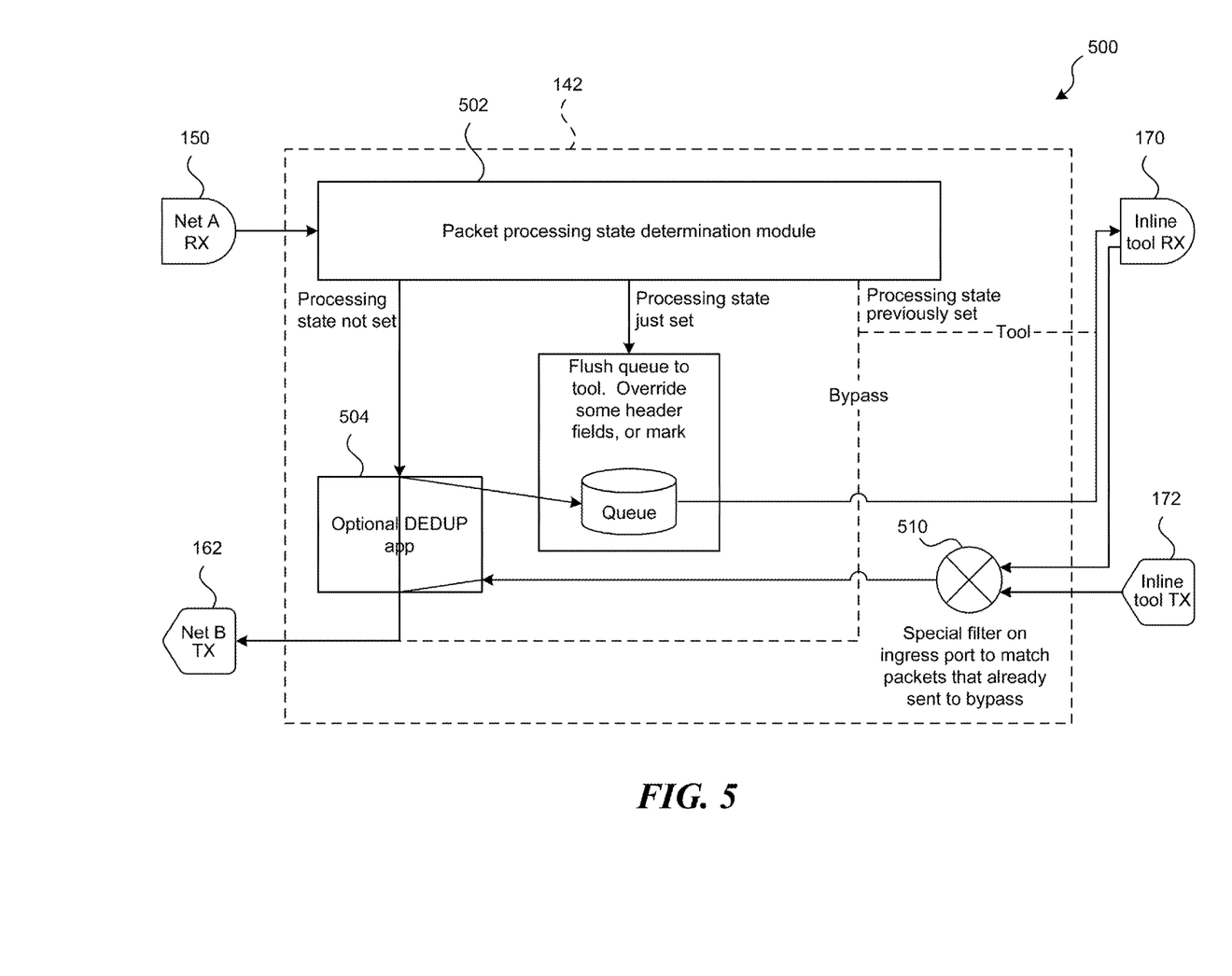
FIG. 5 illustrates a system architecture of the switch appliance/device of FIG. 1.

FIG. 5 illustrates a system architecture of the switch device 100 in accordance with some embodiments. As shown in the figure, the switch device 100 includes the processing unit 142 as discussed. The processing unit 142 includes a processing state determination module 502 for determining whether the packet processing state has been set.

If the processing state determination module 502 determines that no packet processing state has been set, the processing unit 142 then passes the packet received from the transmitting node 160 to the receiving node 162.

On the other hand, if the processing state determination module 502 determines that the packet processing state has just been set (e.g., based on the current packet being processed), the processing unit 142 then either releases the buffered packets for transmission to inline tool(s) (if the packet processing state is set to be the inline-tool processing state), or drops the buffered packets that are duplicate of those that were previously passed to the receiving node 162 (if the packet processing state is set to be the bypass state).

If the processing state determination module 502 determines that the packet processing state was already previously set (e.g., based on one or more previously received packets), the processing unit 142 then either passes the current packet (received from the transmitting node 160 at a network port) to instrument port(s) for transmission to inline tool(s) (if the packet processing state is set to be the inline-tool processing state), or passes the current packet to a network port for transmission to the intended receiving node 162 (if the packet processing state is set to be the bypass state).

As shown in the figure, the processing unit 142 also includes a packet deduplication module 504 for identifying and/or removing duplicate packets. The packet deduplication module 504 keeps track of packets that have been passed to the intended receiving node (e.g., node 162), and/or packets that have been passed to one or more inline tools. For example, a packet may be passed to the node 162, while a copy of the packet is passed to an inline tool. After the inline tool processes the packet, it will return the packet to the switch device 100. In such case, the packet deduplication module 504 may detect that the returned packet is a duplicate of a packet that was already passed to the node 162. Accordingly, the packet deduplication module 504 may then drop the returned packet that was communicated from the inline tool. In some embodiments, the packet deduplication module 504 may use header information to identify duplicate packets. Also, in some embodiments, the processing unit 142 may add a tag (e.g., VLAN tag) to a packet header, and the packet deduplication module 504 may use the tag to identify duplicate packets.

The processing unit 142 may also include a special filter 510 on an ingress port (associated with an inline tool) to match packets that were already sent to the receiving node 162. For example, the ingress port filter may drop packets that match certain modified header field(s). In some cases, the filter 510 may be implemented as a part of the deduplication module 504. In other cases, the filter 510 may be a separate component from the deduplication module 504, and may be used as an alternative to the deduplication module 504.

Specialized Processing System Architecture

Figure 6:
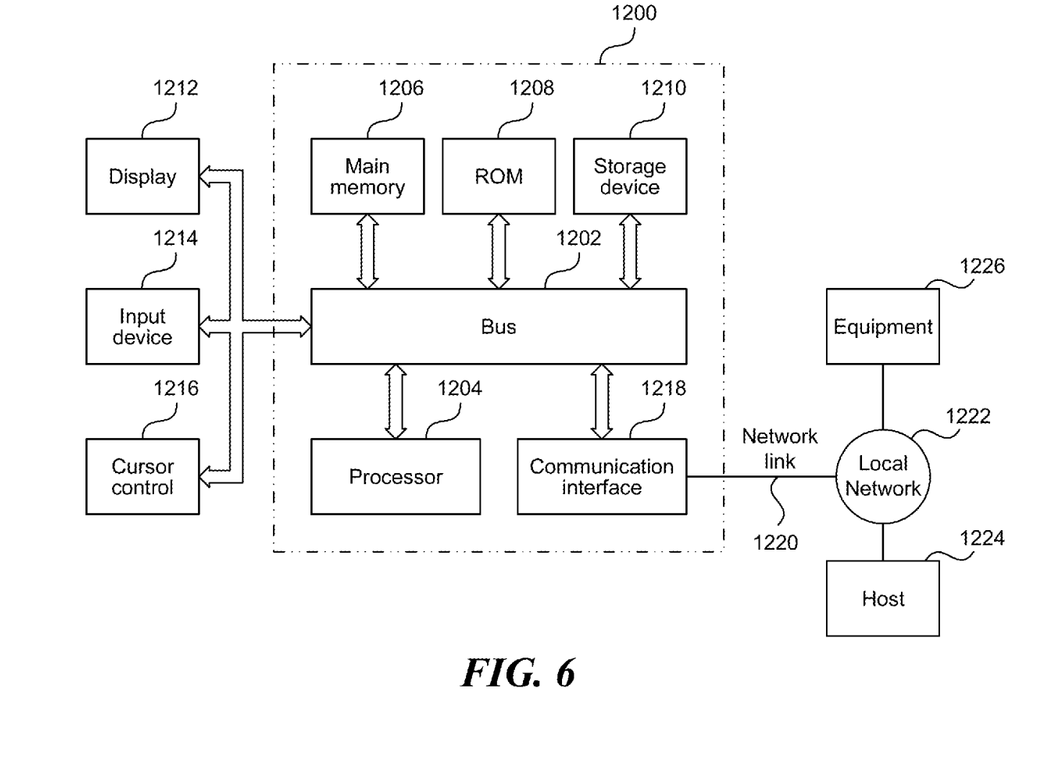
FIG. 6 illustrates a processing system with which embodiments described herein may be implemented.

FIG. 6 is a block diagram that illustrates an embodiment of a specialized processing system 1200 upon which embodiments described herein may be implemented. For example, in some embodiments, the specialized processing system 1200 may be used to implement one or more functions of the processing unit 142 described herein. The processing system 1200 includes a bus 1202 or other communication mechanism for communicating information, and a processor 1204 coupled with the bus 1202 for processing information. The processor 1204 may be used to perform various functions described herein. For examples, the processor 1204 may be a specialized processor having state setting module, packet processing state determination module, session management module, packet deduplication module, buffer monitoring module, or any combination of the foregoing.

The processing system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The processing system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The processing system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The processing system 1200 may be used for performing various functions in accordance with the embodiments described herein. According to one embodiment, such use is provided by processing system 1200 in response to processor 1204 executing one or more sequences of one or more instructions contained in the main memory 1206. Such instructions may be read into the main memory 1206 from another processor-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "processor-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the processing system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The processing system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226. The data streams transported over the network link 1220 can comprise electrical, electromagnetic or optical signals. The signals through the various networks and the signals on the network link 1220 and through the communication interface 1218, which carry data to and from the processing system 1200, are exemplary forms of carrier waves transporting the information. The processing system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it. Also, a "packet" may refer to any part of a packet. For example, a "packet" may be a header of a packet, a payload of a packet, or both.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A switch appliance, comprising:
   a first network port for communication with a first node, the first network port configured to receive a packet;
   a second network port for communication with a second node;
   a first instrument port for communication with a first inline tool;
   a buffer; and
   a processing unit coupled to the first network port, the second network port, the first instrument port, and the buffer;
   wherein the processing unit is configured to determine whether a packet processing state has been set as an inline-tool processing state or a bypass state;
   wherein the processing unit is configured to pass the packet to the second network port for transmission to the second node, and also to store a copy of the packet in the buffer, if the packet processing state has not been set as the inline-tool processing state nor the bypass state.

2. The switch appliance of claim 1, wherein the processing unit is configured to pass the packet to the first inline tool if the packet processing state has been set as the an inline-tool processing state.

3. The switch appliance of claim 1, wherein the processing unit is configured to bypass the first inline tool by passing the packet to the second network port without sending the packet to the first instrument port, if the packet processing state has been set as the bypass state.

4. The switch appliance of claim 1, wherein the processing unit is configured to pass additional packets received at the first network port for transmission to the second node, and also to store copies of the additional packets in the buffer, until the processing unit has sufficient information to determine whether to set the packet processing state as the inline-tool processing state or the bypass state.

5. The switch appliance of claim 4, wherein the processing unit is configured to set the packet processing state as the inline-tool processing state based on the information.

6. The switch appliance of claim 5, wherein the processing state is for a session, and wherein when the packet processing state for the session is set as the inline-tool processing state, the processing unit is configured to operate the buffer to pass packets in the buffer belonging to the session to the first instrument port.

7. The switch appliance of claim 4, wherein the processing unit is configured to set the packet processing state as the bypass state based on the information.

8. The switch appliance of claim 7, wherein the processing state is for a session, and wherein when the packet processing state for the session is set as the bypass state, the processing unit is configured to pass subsequent packets belonging to the session to the second instrument port without sending the subsequent packets to the first instrument port.

9. The switch appliance of claim 1, further comprising a second instrument port for communication with a second inline tool.

10. The switch appliance of claim 1, wherein the processing unit is also configured to determine if a session has already been created for the packet.

11. The switch appliance of claim 10, wherein the processing unit is configured to create a session for the packet if there has been no session created for the packet.

12. The switch appliance of claim 1, wherein the processing unit is also configured to determine if packets in the buffer exceed a limit.

13. The switch appliance of claim 12, wherein the processing unit is configured to pass the buffered packets to a collector if the buffered packets in the buffer exceed the limit.

14. The switch appliance of claim 1, wherein the processing unit includes a packet deduplication module or a filter for removing duplicate packets received from the first inline tool.

15. The switch appliance of claim 1, wherein the processing unit is configured to add information to, or to modify information in, the packet.

16. A method performed by a switch appliance having a first network port for communication with a first node, a second network port for communication with a second node, a first instrument port for communication with a first inline tool, a buffer, and a processing unit coupled to the first network port, the second network port, the first instrument port, and the buffer, the method comprising:

receiving a packet at the first network port;

determining whether a packet processing state has been set as an inline-tool processing state or a bypass state, wherein the act of determining is performed by the processing unit of the switch appliance; and passing the packet to the second network port for transmission to the second node, and storing a copy of the packet in the buffer, if the packet processing state has not been set as the inline-tool processing state nor the bypass state.

17. The method of claim 16, comprising passing the packet to the first inline tool if the packet processing state has been set as the an inline-tool processing state.

18. The method of claim 16, comprising bypassing the first inline tool by passing the packet to the second network port without sending the packet to the first instrument port, if the packet processing state has been set as the bypass state.

19. The method of claim 16, further comprising passing additional packets received at the first network port for transmission to the second node, and storing copies of the additional packets in the buffer, until the processing unit has sufficient information to determine whether to set the packet processing state as the inline-tool processing state or the bypass state, if the packet processing state has not been set as the inline-tool processing state nor the bypass state.

20. The method of claim 19, further comprising setting the packet processing state as the inline-tool processing state based on the information.

21. The method of claim 20, wherein the processing state is for a session, and wherein the method comprises passing packets in the buffer belonging to the session to the first instrument port when the packet processing state for the session is set as the inline-tool processing state.

22. The method of claim 19, further comprising setting the packet processing state as the bypass state based on the information.

23. The method of claim 22, wherein the processing state is for a session, and wherein the method further comprises passing subsequent packets belonging to the session to the second instrument port without sending the subsequent packets to the first instrument port, when the packet processing state for the session is set as the bypass state.

24. The method of claim 16, wherein the switch appliance further comprises a second instrument port for communication with a second inline tool, and wherein the method further comprises passing one or more additional packets to the second instrument port.

25. The method of claim 16, further comprising determining if a session has already been created for the packet.

26. The method of claim 25, further comprising creating a session for the packet if there has been no session created for the packet.

27. The method of claim 16, further comprising determining if packets in the buffer exceed a limit.

28. The method of claim 27, further comprising passing the buffered packets to a collector if the buffered packets in the buffer exceed the limit.

29. The method of claim 16, further comprising removing duplicate packets received from the first inline tool using a packet deduplication module or a filter.

30. The method of claim 16, further comprising adding information to, or modifying information in, the packet.

* * * * *